Dec. 16, 1947.	E. C. WOODS	2,432,847
TYRE FOR VEHICLES
Filed May 21, 1945	3 Sheets-Sheet 1
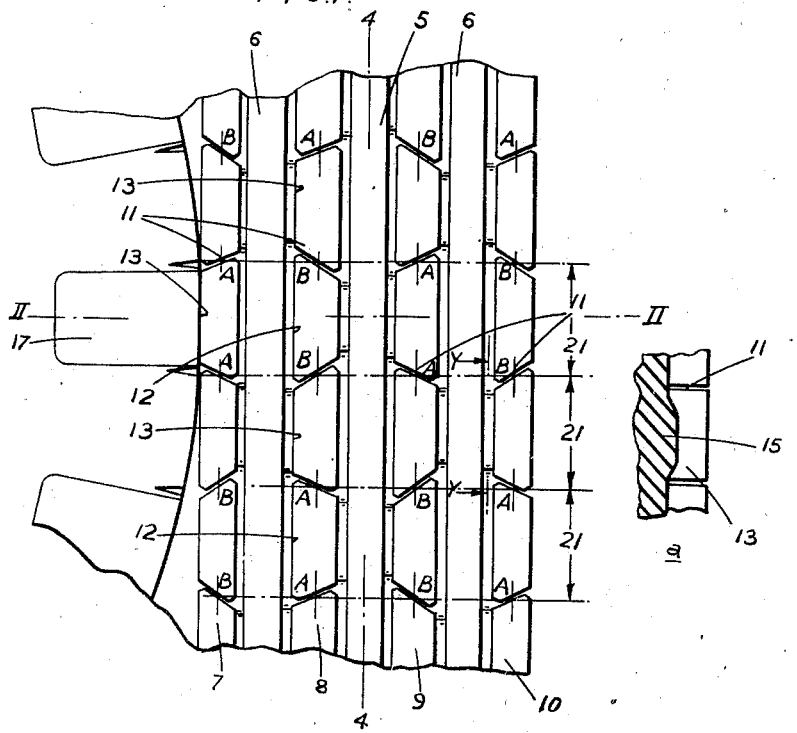
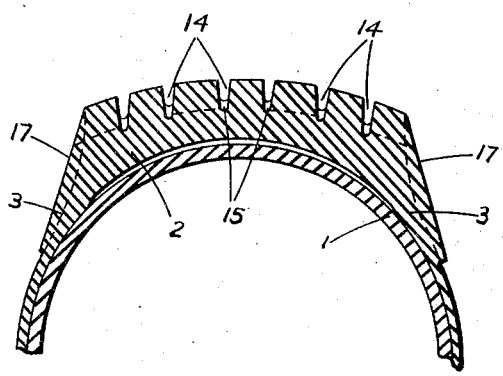
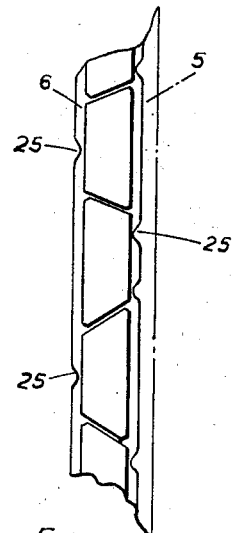
Inventor
Edgar C. Woods
By
Stebbins, Blenko & Webb
Attorneys Dec. 16, 1947.  E. C. WOODS  2,432,847
TYRE FOR VEHICLES
Filed May 21, 1945  3 Sheets-Sheet 2
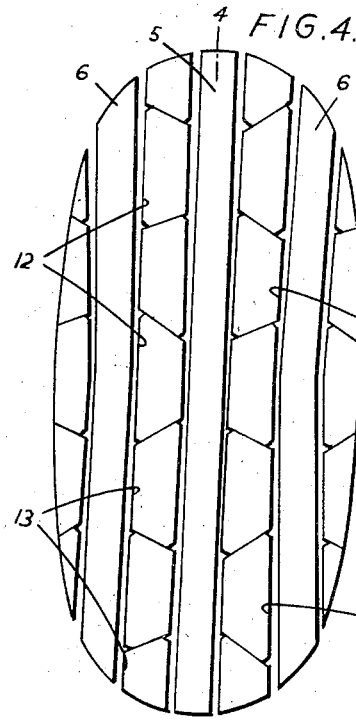
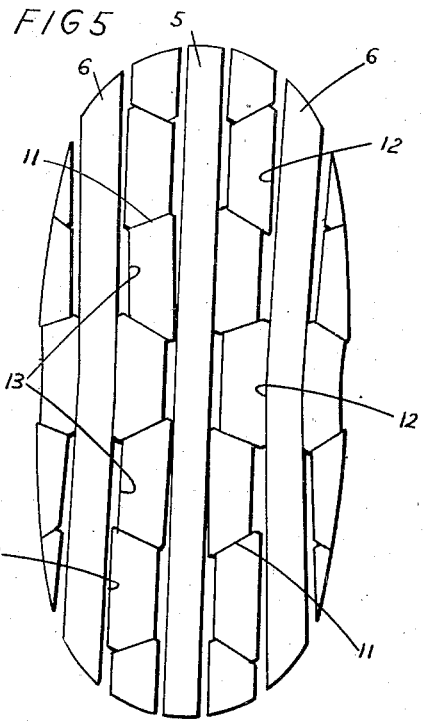
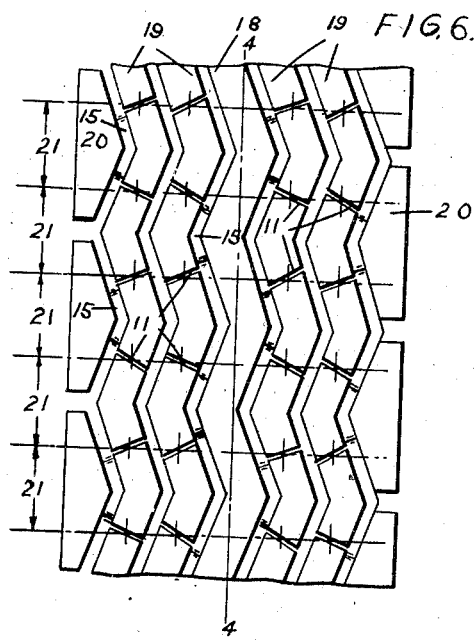
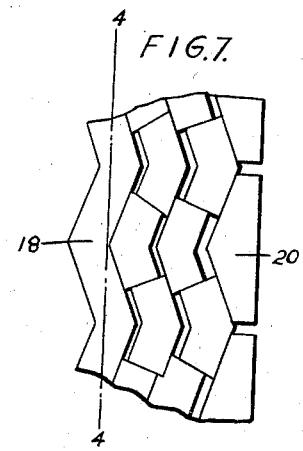
Inventor
Edgar C. Woods
By
Stebbins, Blenko & Webb
Attorneys Dec. 16, 1947.  E. C. WOODS  2,432,847
TYRE FOR VEHICLES
Filed May 21, 1945  3 Sheets-Sheet 3
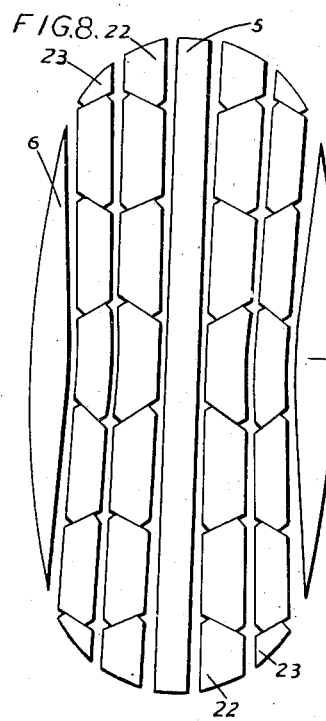
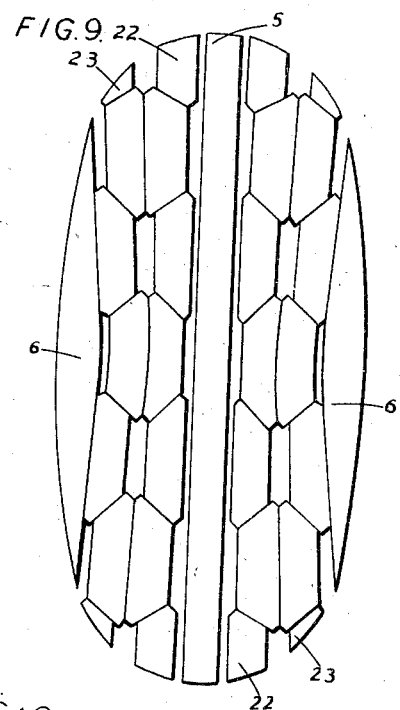
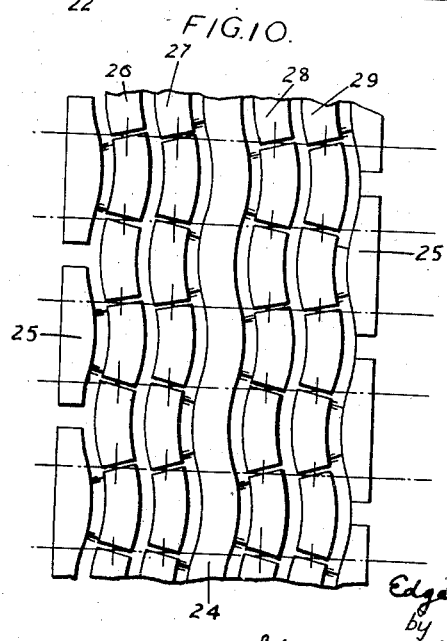
Inventor
Edgar C. Woods
by
Stebbins, Blenko & Webb
Attorneys Patented Dec. 16, 1947

2,432,847

UNITED STATES PATENT OFFICE 2,432,847

TYRE FOR VEHICLES

Edgar Charles Woods, Gravesend, England, assignor to Henley's Tyre & Rubber Company Limited, Dorking, England, a British company Application May 21, 1945, Serial No. 594,817
In Great Britain May 31, 1944

9 Claims. (Cl. 152—209)

This invention relates to tyres for vehicles and deals with the formation of the rubber tread, "rubber" being here used to cover synthetic, substitute or natural rubber. The improved tread gives an increased grip on the road surface when required and provides also other advantages.

This tread is formed, at least in part, of circumferential ribs and one or more of these is divided by cross slits into a number of short sections which are joined together at the root but are capable of relative displacement at the outer surface. In accordance with the invention these sections are shaped by the transverse sub-division of the rib in such a way as to produce relative sideways movement between them when the tread under load comes on to a lubricated surface, that is a surface coated with a semi-fluid or fluid material, such as mud or water, which serves as a lubricant between the tread surface and the road and also penetrates into the slits between the sections of the rib so as to serve as a lubricant there also.

In describing the form of the tread it will be assumed that the tread surface of the tyre has been developed on a plane.

The cross slits in a rib are not all made in parallel planes, but adjacent slits are in planes inclined to each other and the inclination of the slits bounding one section is opposite to that of the slits bounding the directly adjacent sections. As a result of this method of forming the sections, each is a piece of a wedge and the wedges in directly adjacent sections point in opposite directions. Accordingly, under compression, as occurs when the tread makes contact with the road, there is a wedge action tending to force alternate sections to move sideways in opposite directions, thus breaking at each side the smoothness of the rib and providing projections which assist in gripping the road surface. The design will generally be such that normally the friction between the sections will prevent any appreciable relative sideways movement, but this movement will readily take place when lubrication becomes effective.

The nature of the formation and behaviour of the tread in accordance with the invention will be further described with the aid of the accompanying drawings. In these—

Figure 1 shows a portion of a tread pattern of a tyre developed on a flat surface, the buttress pattern of one side only being shown in the development:

Figure 2 is a transverse section of the tyre on a radial plane on the line II—II of Figure 1, which is hereinafter referred to as a normal transverse plane of the tread:

Figure 3 shows a portion of the tread of Figure 1 embodying a modification:

Figure 4 shows the form of the tread area in contact with a dry road, the tread being that shown in Figure 1:

Figure 5 is a view similar to that of Figure 4, but for the case where the conditions are as referred to herein by the word lubricated:

Figure 6 shows a developed view of a tread in accordance with the invention applied to zig-zag ribs:

Figure 7 shows a portion of the tread of Figure 6 when pressed upon a lubricated road surface;

Figures 8 and 9 are views similar to Figures 4 and 5 showing a different form of tread; and Figure 10 shows a developed view of a tread having a wave pattern.

As seen in Figure 2, the tyre as usual consists of the body portion 1 with the tread portion 2 on its radially outer surface, the tread portion being continued by the shoulders 3 leading down into the sides of the tyre.

It is an advantage, both for manufacture in a centrally split mould and for operation, to have a tread symmetrical about the circumferential centre line 4—4 and treads of this kind are shown in the drawings. In the example shown in Figures 1-5 there is a central rib 5 and two side ribs 6 which are undivided and there are four ribs 7, 8, 9 and 10 which lie alternately with the undivided ribs and which are sectionalised in accordance with the method of the present invention. In this sectionalising a circumferential rib with parallel sides is divided up by a number of cross slits 11 into short sections, each in the form of a trapezoid. Each section is bounded by two parallel sides, being the sides of the rib, and two inclined sides making approximately equal internal angles with the longer of the two parallel sides. In the example illustrated two different angles are found distributed over the tread as shown by letters A and B. All the angles marked A are 70° and all the angles marked B are 60°. Angles of this order are found to be effective for the purpose in view, namely, obtaining the displacement by wedge action as shown in Figure 5. The variation in the angles constitutes a subsidiary feature of the invention which will be referred to hereinafter.

Travelling along one side of a rib 7, 8, 9 or 10, we meet alternately long sides 12 and short sides 13 of the trapezoidal sections. The slits 11 between sections are narrow so that the end surfaces of the sections are almost in contact and, when forming that part of the tread which is pressed against the road surface, the endwise (i. e., circumferential) expansion of the sections which accompanies the compression applied to the tread surfaces of the sections will bring these sections into close contact with each other. This is shown in Figures 4 and 5. This pressure with the friction between sections and the friction at the road surface will be sufficient to prevent sliding of these end surfaces over each other as long as they are dry and the running face of the rib is on a dry road surface. Accordingly, although the rib is an assembly of wedges, these wedges will not move relative to each other to any appreciable extent when the wheel is travelling over a smooth dry surface. The condition of the tread will then be as shown in Figure 4, where the long and short edges 12 and 13 of the sectionalized ribs form a substantially continuous line, providing the tread pattern with the property of long life and also with the property of road grip depending on the friction between the rubber of the tread and the dry road surface. When, however, a lubricated road surface is encountered, the restraining effect of friction will be greatly reduced, both at the road surface and between sections. Accordingly, the rib will no longer present at its running face continuous side lines but shows a stepped line at each side as indicated in Figure 5. This is due to the displacement, alternately in opposite directions, of the adjacent sections of the rib, bending from the root where they are joined together and to the body of the tread. This movement of the tread sections effects some wiping of the road surface, removing the lubricating medium and the stepped side edges produced in the tread will enable the rib to grip the surface more freely than a plain rib would do. Figure 5 shows the advantageous effect of the symmetrical arrangement of the sectionalized ribs about the centre plane 4—4 of the tyre in producing a balanced action. It also shows the effects of placing an unbroken rib, such as 5 or 6, alongside a sectionalized rib. This provides a firm grip on a lubricated surface by the formation of pockets between the unbroken rib, such as 5 or 6, and the sections of the adjacent rib 7, 8, 9 or 10 in the displaced position as shown in Figure 5; it also provides a limit to the sideways movement of the sections so as to prevent them from being overstressed at their roots.

In Figures 8 and 9 is shown a tread with central rib 5 and undivided side ribs 6 and with two adjacent sectionalized ribs 22 and 23. In such a case, it is advantageous to provide that the ends of the slits come side by side on the adjacent surfaces of the two ribs causing the long sides of alternate sections in adjacent ribs to come opposite each other so that all the adjacent sections move oppositely when the wedge action is effective. When this takes place as shown in Figure 9 the long sides of half the sections move inwards, meeting in the groove, while the adjacent pairs of sections move outwards thus widening the groove between them. This result is to provide, instead of a continuous groove with smooth side surfaces, a series of pockets thus making a very effective non-slipping form of tread.

It is advantageous to provide an initial tendency towards sideways movement in the required direction for each of the sections of a rib. This can be done in several ways. Examples are shown in the drawings. In the case shown in Figures 1 and 2, the bias is provided by moulding the grooves 14, which separate each sectioned rib from adjacent ribs, to such a form that each has different depths at different places, being shallower alongside the shorter sides of the trapezoidal sections. This is shown by the fragmentary section a at the side of Figure 1. This section is taken on any of the lines Y—Y in Figure 1. It shows that adjacent to each of the shorter sides of the trapezoids the bottom of the groove is shaped to form a raised portion 15. The presence of this raised portion provides an initial tendency in each of the trapezoidal sections towards movement in the direction from the short to the long side when the displacing forces come into operation.

Another way of obtaining the initial tendency is shown in Figure 3. Here projections 25 extending laterally from the sides of the adjacent fixed ribs such as ribs 5 and 6 come into close proximity with the short side of a section of a sectionalized rib.

Where a sectionalized rib, such as 7 or 10, is provided in the tread over the shoulder 3 of the tyre, the shoulder pattern may be made to give the directive tendency just referred to. This may be done as shown on the left side of Figure 1 by arranging a buttress 17 attached to each of the sections which has its shorter side 13 on the outer side of the rib so that these sections have greater resistance to outward movement than the intervening sections.

Although in the preceding description the invention has been described by reference to straight circumferential ribs, it is also applicable to ribs which form zig-zags or waves. An example of zig-zag ribs is shown in Figures 6 and 7. Here there is a central fixed rib 18 with two sectionalized ribs 19 on each side of it and a line of fixed members 20 over each of the shoulders of the tyre. The ribs 19 are sectionalised at slits 11 about the middle of each of the straight parts of the zig-zag, that is half-way between the crests. The slits 11 are approximately at right angles to the sides of these parts of the ribs and the effect of sectionalizing is to provide alternate oppositely pointing wedges as in the case with straight ribs. An initial tendency towards movement in directions opposite to that in which the wedges are pointing is provided, as in the case of Figure 1, by raised portions 15 in the bottom of the grooves adjacent the shorter sides of the sections and between them and the fixed portions of the tyre, that is rib 18 and members 20.

The effect of pressing on a lubricated road surface in displacing the sections and forming pockets between them and the fixed part of the tread is clearly shown in Figure 7.

A similar method of sectionalizing can be adopted with a wave pattern, that is to say, a pattern in which the straight lines and angles of the zig-zag form are replaced by lines curving in an alternating wave. Such a pattern is shown in Figure 10 in which there is a central undivided rib 24 and sectionalized ribs 26 and 27 on one side of the center and 28 and 29 on the other side with fixed side members 25 at the edges of the tread.

In addition to the advantages already herein described, the sectionalizing of the rib in the manner set out also has the effect of minimising noise made by the impact of the separate elements on the road surface, since the contact of the leading edge of a section of a rib on the road surface is made gradually owing to the angular disposition of this edge in relation to a normal transverse plane of the tyre. The noise may be further decreased substantially by making the sections with different angles and with the mean pitch 21 (Figures 1 and 6) of the sections constant. The lengths of the sides then vary, thus avoiding a regular interval between successive impacts. An arrangement of this kind is shown in the accompanying drawings and will be recognized by reference to Figure 1 where the angles are marked, the angles A being of 70° and the angles B of 60°. It will be seen that in this arrangement a section with internal angles of 60° is followed by another section with one internal angle of 60° and the other of 70°. This is followed by a section with two angles of 70° and that is followed by a section in which one angle is 70° and the other is 60°. This scheme is followed round the periphery.

While the figures given for angles have been found satisfactory and are believed to indicate an advantageous range, they are not necessarily the best for all cases. A suitable angle can readily be ascertained experimentally to comply with the condition that relative sideways sliding movement of the sections does not take place when the wheel is running on a dry surface and does take place when it is running on a lubricated surface.

What I claim as my invention is:

1. A tyre having a rubber tread comprising a circumferential rib divided by cross slits into short sections joined at the root, adjacent slits being inclined to each other so that each section is a piece of a wedge with the wedges of directly adjacent sections pointing in opposite directions, the wedge sections being displaceable, under lubricated conditions, sideways of the rib in opposite directions by pressure between their inclined faces when in contact with the road surface.

2. A tyre having a rubber tread comprising a circumferential rib, divided by mutually inclined cross slits into alternately oppositely pointing wedge sections displaceable, under lubricated conditions, sideways of the rib in opposite directions by pressure between their inclined faces when in contact with the road, and a circumferential rib alongside said divided rib and not similarly displaceable and limiting the sideways movements of the sections of the divided rib.

3. A tyre having a rubber tread comprising a circumferential rib, divided by mutually inclined cross slits into alternately oppositely pointing wedge sections displaceable, under lubricated conditions, sideways of the rib in opposite directions by pressure between their inclined faces when in contact with the road, and directive means operating on the shorter edges of the wedge sections assisting the starting of the sideways displacements.

4. A tyre having a rubber tread comprising a circumferential rib, divided by mutually inclined cross slits into alternately oppositely pointing wedge sections displaceable, under lubricated conditions, sideways of the rib in opposite directions by pressure between their inclined faces when in contact with the road, the grooves by which the said rib is separated from the adjacent parts of the tread being shallower in the parts alongside the shorter edges of the wedge sections than alongside the longer edges whereby to assist the starting of the sideways displacement.

5. A tyre having a rubber tread comprising a circumferential rib, divided by mutually inclined cross slits into alternately oppositely pointing wedge sections displaceable, under lubricated conditions, sideways of the rib in opposite directions by pressure between their inclined faces when in contact with the road, a rib alongside said divided rib and not similarly displaceable and lateral projections on said second rib in proximity to the shorter edges of the wedge sections of said first rib whereby to assist the starting of the sideways displacements of the sections.

6. A tyre having a rubber tread comprising a circumferential rib, located over the shoulder of the tyre and divided by mutually inclined cross slits into alternately oppositely pointing wedge sections oppositely displaceable sideways of the rib under lubricated conditions, by the pressure between the wedges when on the road surface, and buttresses at the side of the shoulder springing from the smaller edges of the wedge sections whereby to give these sections resistance to outward movement.

7. A tyre having a rubber tread comprising a circumferential rib with parallel sides, divided by cross slits into sections of trapezoid form with base angles of the order of 60°–70°, the trapezoids being joined at the root and being displaceable sideways of the rib alternately in opposite directions when pressed on the road surface under lubricated conditions, and a substantially non-displaceable rib on each side of said rib against which the longer of the parallel faces of the trapezoids abut when displaced, forming pockets with the adjacent ribs giving effective road-holding properties to the tread.

8. A tyre having a rubber tread comprising an undulating circumferential rib, divided by mutually inclined cross slits located about midway between the crests and troughs of the rib into alternately oppositely pointing wedge sections oppositely displaceable sideways of the rib by the pressure between them when under lubricated conditions on the road surface.

9. A tyre having a rubber tread comprising a zig-zag circumferential rib divided by mutually inclined cross slits located about midway between the angular points of the zig-zags into alternately oppositely pointing wedge sections oppositely displaceable sideways of the rib by the pressure between them when under lubricated conditions on the road surface.

EDGAR CHARLES WOODS.

REFERENCES CITED

The following references are of record in the file of this patent:

UNITED STATES PATENTS

| Number | Name | Date |
|---|---|---|
| 1,203,915 | Schmitt | Nov. 7, 1916 |
| 1,835,639 | Dolding | Dec. 8, 1931 |
| 1,956,011 | Evans | Apr. 24, 1934 |

FOREIGN PATENTS

| Number | Country | Date |
|---|---|---|
| 13,560 | Great Britain | 1910 |